(12) United States Patent
Scantlin (10) Patent No.: US 6,325,088 B1
(45) Date of Patent: Dec. 4, 2001

(54) BUCKLING PIN ACTUATED, PILOT OPERATED PRESSURE RELIEF VALVE

(76) Inventor: Gary W. Scantlin, P.O. Box 5515 c/o Jim Scott, Edmond, OK (US) 73083

( * ) Notice: Subject to any disclaimer, the term of this patent is extended or adjusted under 35 U.S.C. 154(b) by 0 days.

(21) Appl. No.: 09/442,226

(22) Filed: Nov. 17, 1999

Related U.S. Application Data (63) Continuation-in-part of application No. 09/271,071, filed on Mar. 17, 1999, now Pat. No. 6,155,284.

(51) Int. Cl.$^7$ ..................................................... F16K 17/14
(52) U.S. Cl. ........................... 137/70; 137/489; 137/492; 137/506
(58) Field of Search ............................. 137/70, 489, 492, 137/488, 118.02, 506

(56) References Cited

U.S. PATENT DOCUMENTS

| | | |
|---|---|---|
| 2,881,793 | 4/1959 | Lee . |
| 3,095,901 | 7/1963 | Larson . |
| 3,412,743 * | 11/1968 | O'Connor ............................... 137/70 |
| 3,776,251 * | 12/1973 | Trubman ............................... 137/489 |
| 4,210,171 | 7/1980 | Rikuta . |
| 4,289,327 | 9/1981 | Okada . |
| 4,445,531 | 5/1984 | Powell . |
| 4,609,008 * | 9/1986 | Anderson, Jr. et al. ............. 137/488 |
| 4,705,065 | 11/1987 | McNeely et al. . |
| 4,724,857 | 2/1988 | Taylor . |
| 4,776,365 | 10/1988 | Bathrick . |
| 4,787,409 | 11/1988 | Taylor . |
| 4,896,689 | 1/1990 | Taylor . |
| 4,896,690 | 1/1990 | Taylor . |
| 4,930,536 | 6/1990 | Taylor . |
| 4,977,918 | 12/1990 | Taylor . |
| 5,012,834 | 5/1991 | Taylor . |
| 5,067,511 | 11/1991 | Taylor . |
| 5,116,089 | 5/1992 | Taylor . |
| 5,146,942 | 9/1992 | Taylor . |
| 5,209,253 | 5/1993 | Taylor . |
| 5,226,442 | 7/1993 | Taylor . |
| 5,273,065 | 12/1993 | Taylor . |
| 5,297,575 | 3/1994 | Taylor . |
| 5,311,898 | 5/1994 | Taylor . |
| 5,318,060 | 6/1994 | Taylor . |
| 5,348,039 | 9/1994 | Taylor . |
| 5,373,864 | 12/1994 | Taylor . |
| 5,433,239 | 7/1995 | Taylor . |
| 5,575,306 | 11/1996 | Taylor . |
| 5,577,523 | 11/1996 | Taylor . |
| 5,577,524 | 11/1996 | Taylor . |
| 5,685,329 | 11/1997 | Taylor . |
| 5,706,848 | 1/1998 | Taylor . |
| 5,727,586 | 3/1998 | Taylor . |
| 5,836,337 | 11/1998 | Taylor . |
| 5,860,442 | 1/1999 | Taylor . |
| 5,983,729 | 11/1999 | Taylor . |

\* cited by examiner

*Primary Examiner*—Michael Powell Buiz
*Assistant Examiner*—Ramesh Krishnamurthy
(74) *Attorney, Agent, or Firm*—Gary Peterson (57) ABSTRACT

The present invention provides a method, apparatus and system for using sacrificial buckling pin technology for a reliable actuated safety relief valve and for a pilot valve system. The buckling pin fails at a predicted, predetermined system pressure through transfer of force exerted by the system pressure on a sensing piston or diaphragm to the buckling pin. The buckling pin failure triggers the release of a latch mechanism that releases the actuator assembly to slide away from the valve seat to initiate relief flow. The use of the buckling pin as a trigger for release of a latch provides for valves with high flow rates without the use of large, unmanageable buckling pins. The use of a buckling pin valve as a pilot valve to control a single or multiple relief valves operating together as a pressure relief system is preferred as particularly advantageous.

14 Claims, 10 Drawing Sheets

BUCKLING PIN ACTUATED, PILOT OPERATED PRESSURE RELIEF VALVE

CROSS-REFERENCE TO RELATED APPLICATION

The present application is a continuation-in-part of a co-pending application of the present inventor entitled, "Buckling Pin Latch Activated Safety Relief Valve", Ser. No. 09/271,071; filed Mar. 17,1999, now U.S. Pat. No. 6,155,284.

BACKGROUND OF THE INVENTION

1. Field of the Invention

The present invention relates to actuated safety relief valves. More specifically, the present invention relates to actuated relief valves that use a sacrificial buckling pin as a trigger for an actuator and to pilot valve safety relief system.

2. Background of the Invention and Related Art

The use of sacrificial buckling pins is widely known in the valve industry. Through the selection and use of appropriate materials, buckling pins can be designed to fail with a high degree of reliability and accuracy upon the application of a predetermined axial compressive force. The maximum compressive load for a buckling pin is dependent on its slenderness, which is a function of the pin length and the diameter of its cross-section. For compressive axial failure, the ultimate compressive capacity of the pin is easily calculated using Euler's law relating the critical force to the modulus of elasticity of the material, the minimum moment of inertia of the cross section and the unsupported length of the pin. This principle does not apply if the bucking pin material is subject to an intervening mode of failure due to eccentric loading, material defects or yield stress limitations. The use of reasonably sized buckling pins is ideal for relief valve applications because of the simplicity of the device, the ease of replacement, low manufacturing, maintenance and upkeep costs, and the elimination of complicated electronic, pneumatic or spring mechanisms common in many existing valve actuators.

The primary objective of safety relief valve designers is to obtain the maximum fluid flow capacity in order to relieve excessive system pressure. High flow capacities require a large orifice at the valve seat, especially in low pressure applications. In existing safety relief valves that use sacrificial buckling pins, the size of the valve orifice is directly determined by the physical displacement of the "active" or moving end of the buckling pin upon buckling failure. In other words, the physical collapse or "stroke" of the buckling pin directly determines the size of the orifice opened for relief flow. Consequently, the conventional use of buckling pins limits the relief capacity of the valve, requiring either redundant valves or excessively large valves in order to obtain the desired flow capacity.

The ultimate failure load of a buckling pin is more predictable if the length and size of the pin fall within a range of favorable slenderness ratios. With existing buckling pin design large valves or high pressure valves require a very long or large buckling pins, often resulting in a buckling pin that is of an awkward length or size for reliable prediction of buckling pin failure. Unfavorable slenderness ratios and intervening failure modes related to material yield stress, material defects or eccentric loading causes problems with buckling pin design and selection.

In safety relief valves, it is important to create a large orifice at the valve seat to quickly relieve system pressure by rapid removal of gas or liquid from the system. The required size of the orifice necessarily depends on the available pressure differential across the valve, the desired flow rate and fluid properties. Generally, the smaller the stroke of the valve, the smaller the orifice made available for relief flow, the larger the valve must be in order to achieve its purpose.

Figure 1A:
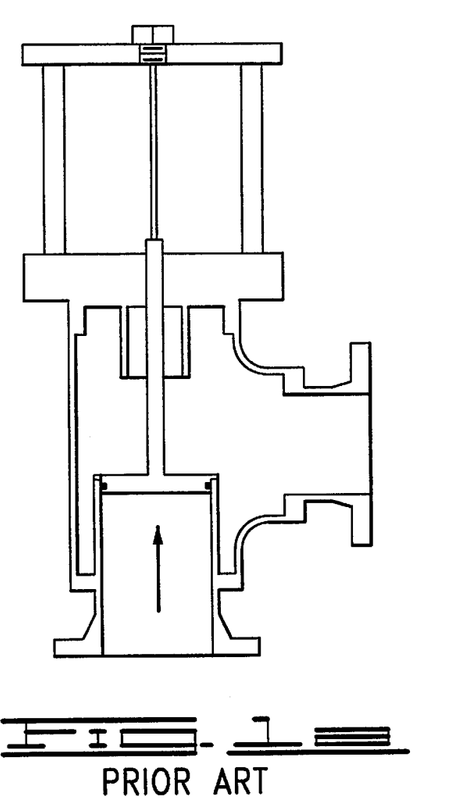
Figure 1B:
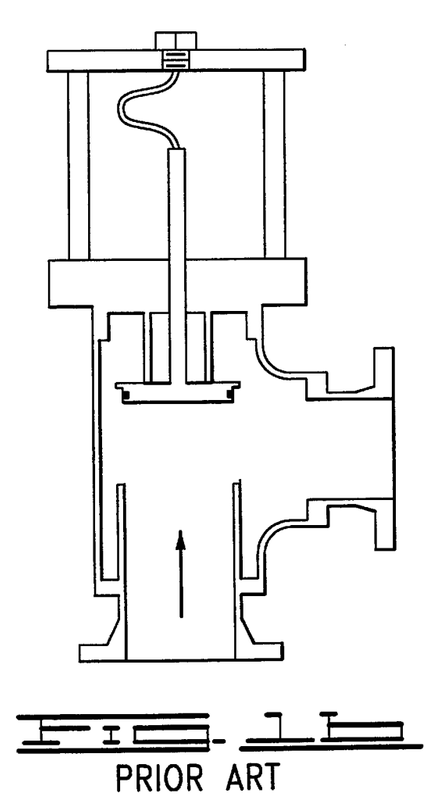

FIGS. 1(a) and 1(b) show a prior art relief valve in closed and open positions, respectively. The prior art valve uses a buckling pin as a direct and stand alone actuator to oppose the full process pressure applied against a relief valve. In this relief valve, the stroke is determined by the difference in the original and failed buckling pin lengths. High flow capacities in existing buckling pin actuator valves are obtained only by increasing the length of the buckling pin in order to increase displacement of the valve flapper, piston, plug or other actuated component. Longer collapse displacements required by large valves require longer, larger and more expensive buckling pins. Reliability and accuracy of predicted buckling pin failure loads are lost due to unfavorable slenderness ratios and the increasing intervention of other pin failure modes. Intervening failures related to material defects, material yield stress limitations and manufacturing irregularities may determine the ultimate load of the buckling pin.

Other existing valves may use mechanical linkages to mechanically reduce the force applied to the buckling pin in order to keep buckling pin slenderness ratios in the favorable range. Mechanical linkages using the lever arm principle provide a means of scaling the force applied to the linkage down to a manageable level. Inaccuracies and poor reliability result from wear or friction losses introduced by movable mechanical joints, all of which are magnified by the scaled mechanical advantage gained in the linkage, and result in an overall loss of valve accuracy and reliability. Therefore, there is a need for a simplified buckling pin actuated relief valve that avoids the problems of limited displacement, oversized buckling pins and inaccurate mechanical linkages. There is also a need for a durable, low maintenance buckling pin actuated safety relief valve that is easily reset and returned to service and inexpensive to manufacture and maintain.

SUMMARY OF THE INVENTION

Pursuant to the foregoing, it may be regarded as an object of the present invention to overcome the deficiencies of and provide for improvements in the state of the prior art as described above and as may be known to those skilled in the art.

It is an object of the present invention to provide an improved safety relief valve.

It is a further object to provide an improved safety relief valve employing buckling pins.

Yet another object of the present invention is to provide an unique pilot-buckling pin relief valve system.

Still further objects may be recognized and become apparent upon consideration of the following specification, taken as a whole, in conjunction with the appended drawings and claims, wherein by way of illustration and example, various embodiments of the present invention are disclosed and taught.

In one embodiment of the present invention, a buckling pin actuated safety relief valve having a calibrated buckling pin held within an actuator is provided. The actuator includes a pressure sensing piston, a sensor stem, one or more latch arms, a primary stem, a piston cylinder, one or more pin arms and a latch mechanism. The piston is connected to the sensor stem, which is connected to the latch arms, forming a censor assembly. Similarly, the piston cylinder is connected to the primary stem, which is connected to the pin arms, forming a seat assembly. The sensor assembly and the seat assembly, along with the buckling pin, form the actuator.

The pressure sensing face of the sensing piston transfers the force exerted by the system pressure on the sensing piston through the sensor stem to the end of the buckling pin. The buckling pin is held static by the equal and opposite resisting force applied to the opposite end of the buckling pin by the pin arms.

The pin arms are connected through the primary stem to the piston cylinder. The circumference of the piston cylinder seals at the seat in the valve. The piston cylinder is held firmly against the valve seat by a latch mechanism. The piston cylinder allows limited displacement of the sensing piston within the piston cylinder. The system pressure acting on the face of the sensing piston urges displacement of the sensing piston within the piston cylinder and places a force against the buckling pin. When the force exerted on the face of the sensing piston exceeds the compressive load bearing capacity of the buckling pin, buckling mode failure of the pin occurs, with simultaneous release and displacement of the latch arms relative to the latch mechanism. Displacement of the latch arms triggers the latch mechanism, releasing the primary stem and unseating the piston cylinder from the valve seat. The actuator is then further displaced, substantially without resistance, away from the seat by the system pressure thereby forming an orifice at the seat and initiating relief flow from the inlet to the outlet. Displacement of the actuator from the scat may be assisted by a sprint or other biasing member or source of stored energy. The displacement of the actuator is preferably limited, but allows the piston cylinder and sensing piston to be sufficiently displaced to avoid restricting the flow through the orifice. The actuator just described can also be used to close the valve upon buckling pin failure against the system pressure in a "fail safe closed" application.

The flow capacity achieved by this valve design far exceeds the flow capacity that could be obtained by the limited displacement of the piston provided by the collapse of the buckling pin. Furthermore, the use of a latch mechanism with a buckling pin trigger affords the use of smaller, less expensive and more accurate and reliable buckling pins while increasing valve flow capacity.

A particularly preferred embodiment of the present invention is one which is also of a particularly subtle and elegant nature. In this embodiment, a buckling pin valve is used as a pilot valve to control a single larger, or multiple larger, fabricated relief valve or valves operating together as a pressure relief system.

In presently known pilot operated devices it is known to utilize a spring loaded or pressure assisted poppet valve or valves to control a larger, diameter relief valve with orifices adjacent to the pilot valve. These systems tend to be somewhat unreliable due to inaccurate set pressures and may become inoperative should the pilot valve or pilot piping become clogged due to the pilot's or the piping's relatively small size. Such pilot systems may become cost prohibitive in the larger sizes. Using a rupture pin valve by itself may result in control problems such as "slamming" open. These systems also may require large, expensive replacement buckling pins and may result in very large valves and relief systems.

This embodiment of the present invention uses a buckling pin device to control one or more (usually) larger fabricated valve or valves. This design allows flexibility in the location of the pilot valve which may be removed from the main valve body. As a result of the buckling pin pilot valve being one of recognized accuracy and its non-clogging design it is possible to increase the total system's accuracy and to reduce the possibility of valve system failure.

By controlling the flow rate of the discharge through the pilot by controlling the size of the rupture pin pilot, or by a restricting orifice, the speed at which the valve opens can be controlled to reduce or eliminate the "slamming open" which is so often encountered when using the prior art technology. The total size of the system package employing this embodiment of the present invention may also be much smaller physically than the prior art systems.

In appreciating the strength and potential of this embodiment of the present invention, it is important to realize that the present embodiment may use one pilot to control a multiple number of controlled valves. This fact means it is possible to eliminate the need for extremely large valves even when large flows are required. Multiple valves of a reasonable size can be manufactured in a system with one controlling pilot valve which may be remotely located for easy access at a fraction of the cost of a single large rupture pin valve of the prior art design.

Maintenance is easier when the smaller valve system of the present embodiment are employed. In addition such smaller systems are easier to handle over all. Shipping and handling costs are reduced when the smaller, lighter packages and crates made possible by the employment of the present embodiment are utilized. These features reduce the cost of operation for the end user.

Figure 7:
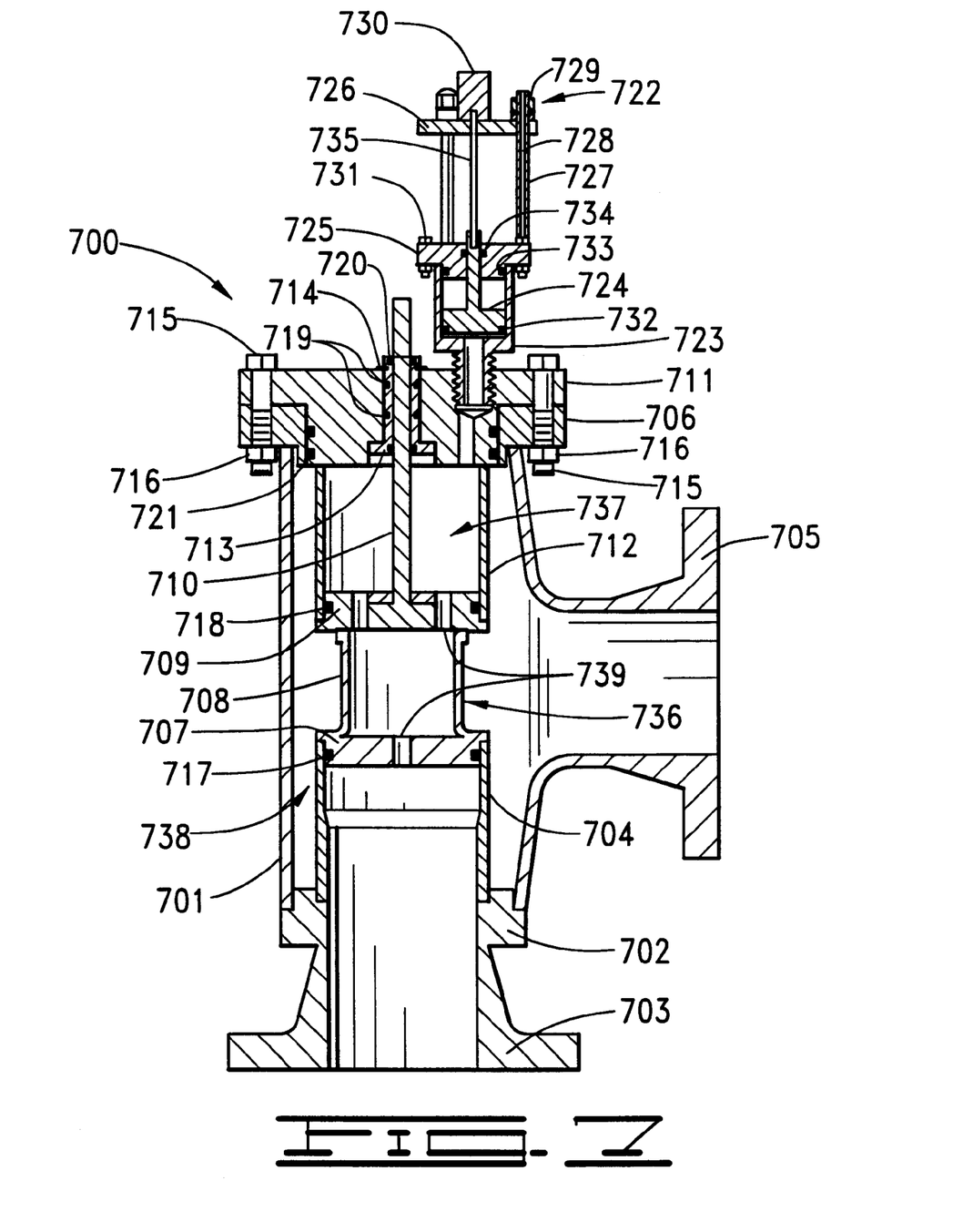
FIG. 7 is a cross-sectional view of a buckling pin pilot operated pressure relief valve in accordance with the present invention.

The design of one embodiment of the present invention is shown in FIG. 7. A pressure relief valve is formed from a main piston and a main piston seat. The main piston is held on the main piston seat by the opposing force created by the balance piston within the balance seat. The main piston has a net area which is less than the net area of the balance the piston and the piston stem. The balance piston and balance seat work within the confines of the bonnet to create the balance chamber. When the system pressure, contained in the balance chamber, has transferred from below the main piston, through a hollow piston spacer and into the balance chamber and is relieved by the rupture pin pilot valve, the net force on the movable piston assembly composed of a piston head, piston spacer, balance piston and between piston stem is shifted from the "downward" or closed position to an "upward" or open position.

As described above, the system pressure is the outside pressure entering the pressure relief valve through the inlet flange which is being controlled by the present system.

The size of the rupture pin valve, the transfer holes in the movable piston assembly or both must be controlled to assure complete opening of the main piston. For example, if the transfer holes and the rupture pin valve are of sufficient size to bypass all of the required flow to relieve the system, the main piston may not need to open.

In any case, in normal operation the system pressure will then be allowed to flow through the inlet flange, main piston seat and out the outlet flange, thus relieving the excessive system pressure to a safe condition.

To place the system back into operation, the moveable piston assembly is pushed back "on seat" or downward, until the main piston seal contacts inlet seat.

The rupture pin valve is also "reseated". The pilot piston is pushed downward on the seat and a new rupture pin is installed.

When system pressure is again "built up", the net forces developed by the movable piston assembly and balance chamber will force the piston assembly securely into the main piston seat, restoring the system to its full operating condition.

The present embodiment will of course find utility in the flare gas industry and will also find other utility and specific applications anywhere large volumes of gas or liquid must be controlled from over-pressuring the containment system.

The specific and detailed operation of the rupture pin valve in this embodiment is otherwise as described herein with regard to the other described embodiments.

As has been noted above the present embodiment may be employed to act as a pilot for a single or multiple other valves. In addition the present pilot embodiment may be cascaded with other pilot valves or other valve configurations. In addition the pilot valve may be arranged with other valves in series or parallel configurations to provide cascading control effect or to provide redundancy and added safety in and to the system.

To review the scope of the present invention, and in particular this preferred pilot embodiment, a safety relief system is provided which includes a pilot valve, a pressure relief valve, a body having at least one fluid inlet communicating through a pressure relief valve to at least one fluid outlet, and a pilot valve having at least one buckling pin coupled to buckle at a predetermined system pressure, wherein failure of the buckling pin causes the pressure relief valve to allow fluid communication between the fluid inlet and outlet. The pilot valve may control more than one other valve. The pressure relief valve includes at least one balance chamber assembly responsive to the failure of the buckling pin to allow fluid communication between the inlet and outlet. The balance chamber assembly includes at least two pistons of different areas so that the failure of the buckling pin results in differential forces acting on the pistons causing them to open the flow from the inlet to the outlet. The valve piston is held on a seat by the opposing force created by a balance piston and the pistons are separated by a hollow piston spacer through which fluid may pass. The failure of the buckling pin in the pilot valve results in net forces on a movable piston assembly including pistons and spacer to open the flow from inlet to outlet relieving excessive system pressure to a safe condition.

The present invention may also be set forth as a method of relieving excess pressure using a pilot valve, a pressure relief valve, a body having at least one fluid inlet communicating through the pressure relief valve to at least one fluid outlet, with the pilot valve having at least one buckling pin coupled to buckle at a predetermined system pressure, wherein failure of the buckling pin causes the pressure relief valve to allow fluid communication between the fluid inlet and the fluid outlet. The pilot valve may be used to control more than one other valve. The pressure relief valve includes at least one balance chamber assembly responsive to the failure of the buckling pin to allow fluid communication between the inlet and outlet. The balance chamber assembly includes at least two pistons of different areas so that the failure of the buckling pin results in differential forces acting on the pistons causing them to open the flow from inlet to outlet.

The method utilizes a valve piston held on a seat by the opposing force created by a balance piston. The pistons may be separated by a hollow piston spacer through which fluid may pass. The failure of the buckling pin in the pilot valve results in net forces on a movable piston assembly including said pistons and spacer to open the flow from inlet to outlet relieving excessive system pressure to a safe condition.

The method as noted employs a piston secured against a seat and a pilot valve exposed to the pressure to be controlled. The forces are transmitted to a buckling pin in the pilot valve to cause it to fail at a predetermined pressure, that is, the buckling pin is caused to fail when the pressure exceeds a predetermined pressure. The failure of the buckling pin causes the displacement of the pistons to permit the flow of fluid from inlet to outlet.

BRIEF DESCRIPTION OF THE DRAWINGS

The drawings constitute a part of this specification and include exemplary embodiments of the present invention, which may be embodied in various other forms. So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments. It is to be further understood that in some instances various aspects of the invention may be shown exaggerated, reduced, or enlarged, or otherwise distorted to facilitate an understanding of the present invention.

In the drawings appended hereto:

FIGS. 1 (*a*) and (*b*) are "collapse displacement" valves in the prior art shown in the closed and open positions, respectively.

FIGS. 2 (*a*), (*b*), and (*c*) are buckling pin latch actuated valves shown in the closed, intermediate, and open positions, respectively.

FIGS. 3 is a low pressure buckling pin latch actuated valve shown in the closed position.

FIGS. 4 (*a*) and (*b*) are buckling pin latch actuated valves with spring assisted opening shown in the closed and open positions, respectively.

FIG. 6 is an exploded view of a buckling pin valve.

In the accompanying drawings like elements are given the same or analogous references when possible for clarity. The same or analogous reference to these elements will be made in the body of the specification, but other names and terminology may also be employed to further explain the present invention.

DETAILED DESCRIPTION OF PREFERRED EMBODIMENTS AND EXEMPLARY BEST MODE FOR CARRYING OUT THE INVENTION

For a further understanding of the nature, function, and objects of the present invention, reference should now be made to the following detailed description taken in conjunction with the accompanying drawings. Detailed descriptions of the preferred embodiments are provided herein, as well as, the best mode of carrying out and employing the present invention. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner. The practice of the present invention is illustrated by the following examples, which are deemed illustrative of both the process taught by the present invention and of the product and article of manufacture yielded in accordance with the present invention.

The present invention relates to a method and apparatus for using a buckling pin to release a latch mechanism that strokes a safety relief valve. The safety relief valve is exposed to the fluid pressure in a process vessel or stream and is actuated by pressures that exceed the set pressure of the relief valve.

One aspect of the invention provides a "fail safe closed" safety relief valve in which a force corresponding to the monitored system pressure is mechanically transferred to a buckling pin. When the monitored process pressure reaches the valve set pressure, sacrificial failure of the buckling pin occurs, thereby triggering an actuator latch release mechanism that allows the valve to open or close as may be appropriate for the given equipment and context. The set pressure is determined by the cross-sectional area of a sensing member that transfers the process pressure against the buckling pin and the strength of the buckling pin itself. Buckling pin strength is in turn determined by the material and slenderness of the buckling pin.

Another aspect of the invention is a sensing member for a safety relief valve. At the sensing member may be designed to have any desirable amount of surface area exposed to the process pressure. A small surface area sensing member, such as a piston when subjected to moderate pressures, will transfer a smaller amount of force against the buckling pin, thereby allowing a smaller buckling pin to be utilized. A large surface area sensing member, such as a diaphragm when subjected to very low pressures, will transfer a larger amount of force against the buckling pin, thereby allowing the use of a larger buckling pin. In this manner, the choice of a buckling pin for any given set pressure is effected by the exposed area of the sensing member, and the two variables (buckling pin strength and exposed area) must be taken into account. This design provides for relief valves of different set pressures to use the same buckling pin, but have different exposed surface areas of their sensing members. This provides the advantage of allowing maintenance crews to stock a fewer number of buckling pins for use in an unlimited number of safety valves having different set pressures. Further, this provides another advantage in that the buckling pins may be designed and chosen in a size that is well suited for reliability and accuracy of buckling mode failure, rather than simply by the magnitude of the buckling mode failure.

Another aspect of the invention is an actuator for a safety relief valve. The actuator includes a sensing, member or sensing, piston in cooperation with a separate piston cylinder or plug that engages the valve seat. The buckling mode failure of the buckling pin allows the sensing member to release a latch mechanism that otherwise holds the piston cylinder or plug seated against the valve seat. Once the latch is released, the piston cylinder is pushed away from the seat by the process pressure. Preferably, the stroke of the piston cylinder is long enough that the actuated piston cylinder provides little or no resistance to fluid flow through the valve. The relief value is reset by replacing the failed buckling pin with a new buckling pin and resetting the valve.

Yet another aspect of the invention is a compact actuator for safety relief valve in which the sensing member is disposed concentrically with the piston cylinder. More particularly, the sensing member has a surface area that is only a portion of the surface area across the exposed face of the piston cylinder when it is seated in the valve. Therefore, while the sensing member is exposed to the pressure (i.e., force per unit area), the sensing member is subjected to less force than would the entire exposed face of the piston cylinder. The sensing, member and the piston cylinder are coupled to the proximal end of two concentric shafts. The distal ends of the concentric shafts are coupled by the buckling pin in a manner to resist relative axial movement of the two concentric shafts, i.e., the buckling pin is at least parallel to the axis of the concentric shafts and preferably axially aligned with the concentric shafts. The shaft coupled to the sensing member also includes a latch retaining member, such as a shoulder, pin, etc., to releasably secure a latch mechanism or latch arm that maintains the piston cylinder in a seated position. The latch arm, which is preferably pivotally coupled to the valve body, is designed to release the piston cylinder upon movement of the latch retaining member during buckling mode failure of the buckling pin. When the piston cylinder is released, both the piston cylinder and the sensing member are slidably pushed away from the valve seat to allow pressure relief to the process fluid. This aspect of the invention is particularly desirable for use in high pressure processes.

Another aspect of the invention is particularly desirable for use in low pressure processes. The safety relief valve is provided with a diaphragm in fluid communication with the monitored process fluid and is exposed to the process pressure across the face of the diaphragm. The diaphragm applies a force against the buckling pin corresponding to the system pressure acting against the full area of the diaphragm. When the monitored system pressure reaches the valve set pressure, sacrificial failure of the buckling pin occurs and a latch mechanism securing the piston cylinder or valve plug is released from its positioned scaled against the valve seat. It should be recognized that many suitable mechanical latches and trigger mechanisms may be used to release the piston cylinder upon failure of the buckling pin and these mechanisms are considered to be within the scope of the present invention. Particularly, the present invention encompasses mechanical linkages that allow the buckling pin to be positioned in various relative positions between the piston cylinder and the sensing member so long as the buckling pin triggers the release of the piston cylinder or other valve sealing member, such as a gate, ball, or needle.

Figure 2:
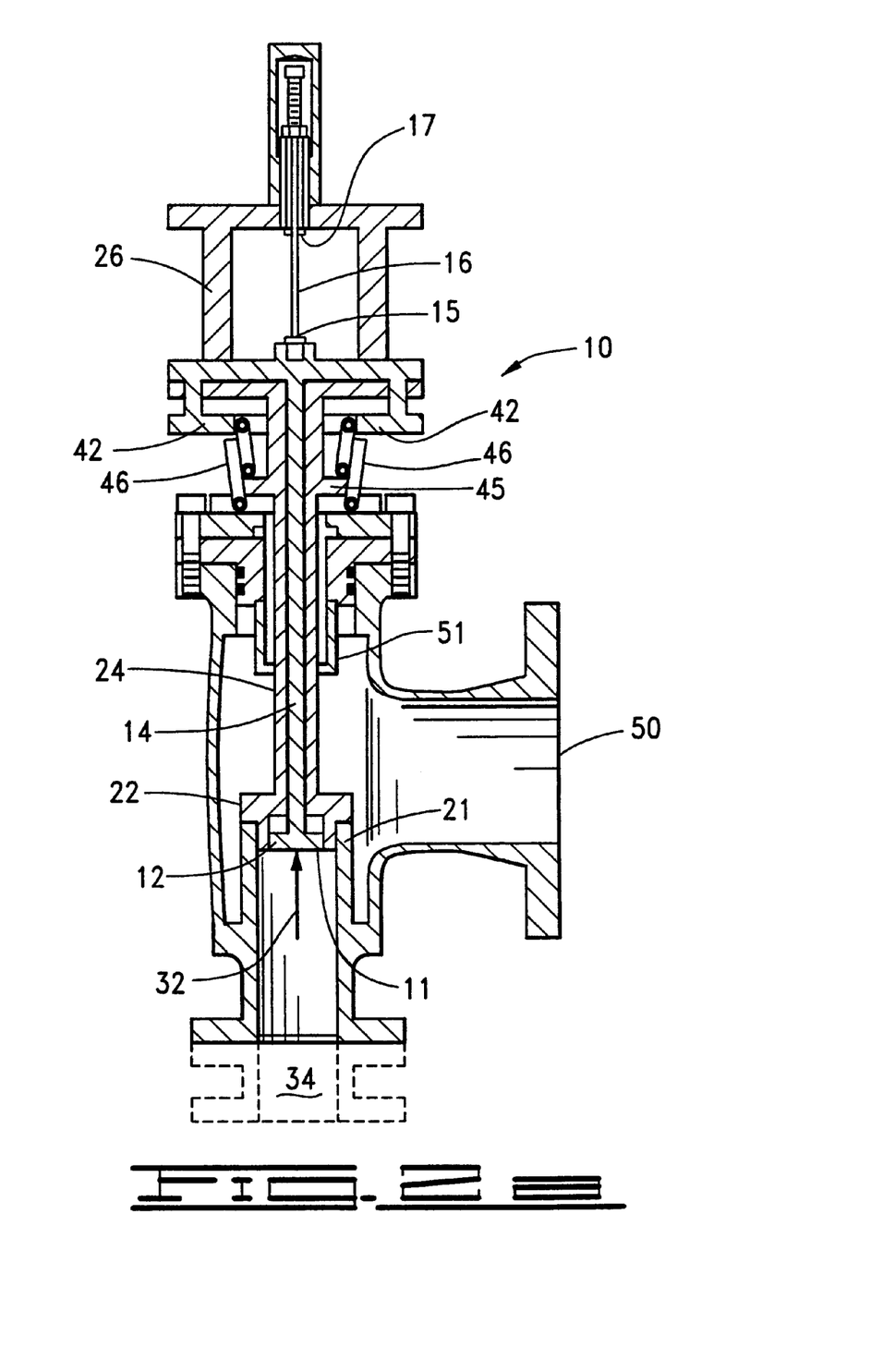

FIG. 2($a$) is a cross-sectional view of a safety relief valve 10 with a buckling pin 16 shown in a normal condition maintaining the valve in a closed, monitoring position. The buckling pin 16 is aligned with the sensing stem 14 that is joined to the pressure sensing piston (piston) 12. The buckling pin 16, sensing stem 14 and piston 12 make up the sensing assembly. The piston 12 reciprocates within a concentric piston cylinder (cylinder) 22 that is sealably connected to a tubular primary system (primary stem) 24 that is joined to arms or pins 26. A compressive force 32 corresponding to the system pressure 34 acting against the piston 12 is applied to the active end 15 of the buckling pin 16.

If the system pressure 34 is less than the set pressure of the valve, the pin arms 26 remain in place holding the static end 17 of the buckling pin 16 against the opposing compressive force applied to the active end 15 of the buckling pin. The force applied to the active end 15 of the buckling pin is determined by the magnitude of the system pressure 34 on the exposed face 11 of the piston 12. The magnitude of the force applied to the buckling pin 16 is equal to the system pressure times the cross-sectional area of the exposed face 11 of the piston 12 on a plane perpendicular to the axis of the sensing stem 14.

The latch fingers 46 hold the primary stem 24 in place with the cylinder 22 sealed against the valve seat (seat) 21. The sensing stem 14 is connected to two latch arms 42 that hold the latch fingers 46 in position against the latch collar 45. The latch collar 45 is connected to the primary stem 24 joined to the cylinder 22 and, when the cylinder 22 is secured against the seat 21 by the latch fingers 46, the valve remains in the closed position.

Figure 2B:
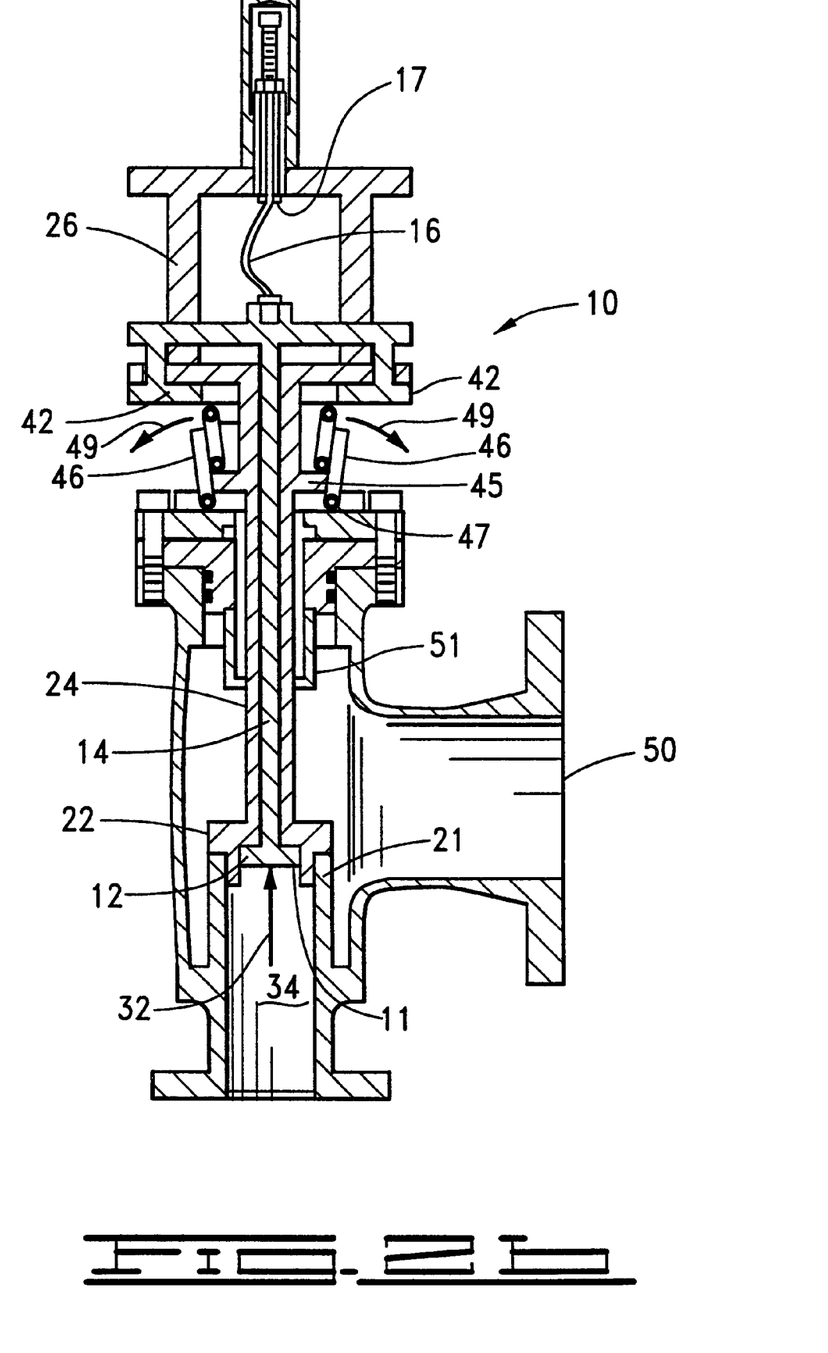

FIG. 2(*b*) shows the valve immediately after buckling failure of the buckling pin 16. The piston 12 has traveled toward the buckling pin 16 within the cylinder 22. Once the pin begins to buckle, the force required to completely collapse the buckling pin is substantially smaller than the force required to initiate buckling failure. These failure mechanics ensure full collapse of the buckling pin and corresponding full travel or stroke of the piston 12 within the piston cylinder 22.

Figure 2C:
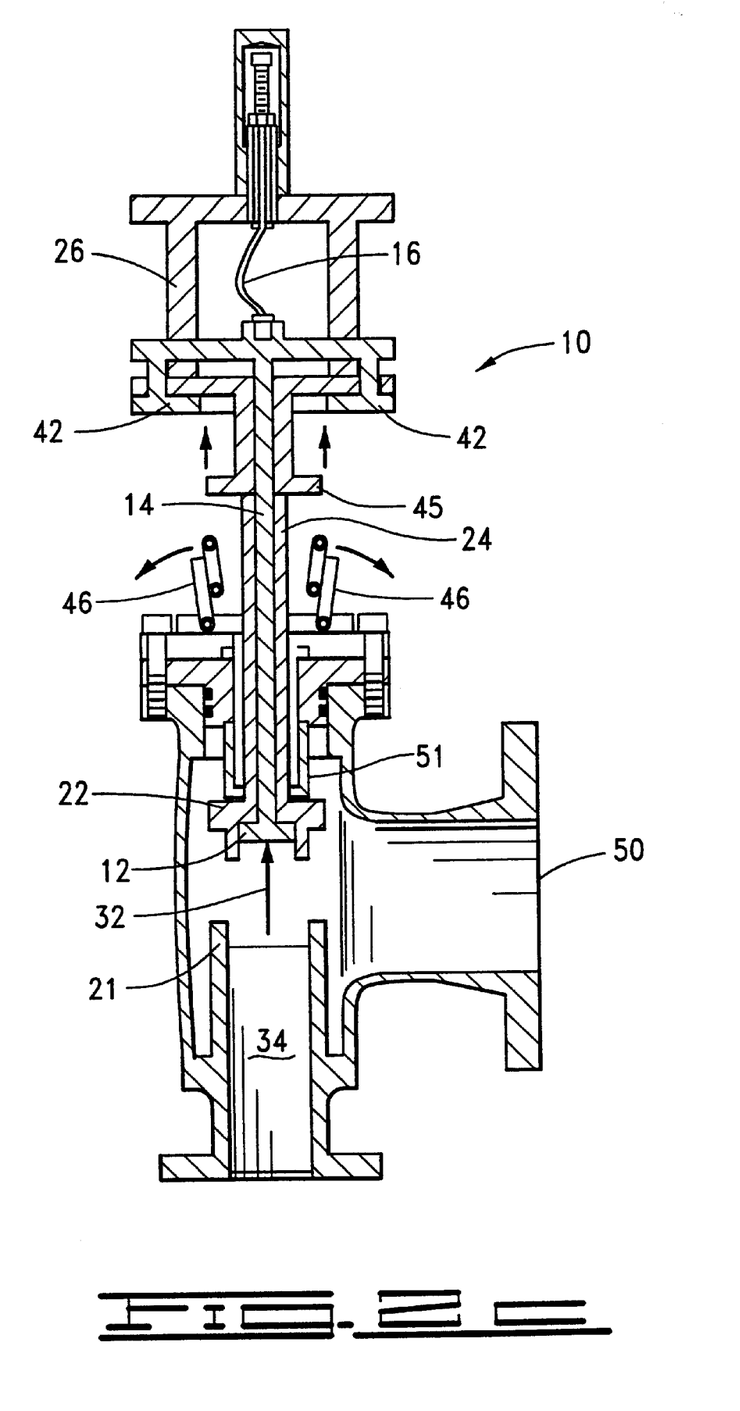

Because the sensing piston 12 and stem 14 have traveled toward the buckled buckling pin 16, the latch arms 42 have become disengaged from the latch fingers 46, to release the latch collar 45 coupled to stem 24. The latch fingers are pivotally coupled to the valve body at pivot point 47 to ensure that the latch fingers 46 are displaced away from the latch collar 45 (as shown by arrows 49) under the force 32 placed on the primary stem 24. The latch mechanism is designed to avoid friction, mechanical losses and maintenance problems associated with mechanical linkages having a greater number of moving parts and components. The latch fingers may be mechanically biased to pivot outwardly to the latch release position shown in FIG. 2 (*c*) using mechanical leverage or spring.

FIG. 2 (*c*) shows the valve in the open position following failure of the buckling pin 16. The latch release allows the system pressure or other biasing member, such as a spring to displace the actuator away from the seat, thereby opening an orifice at the seat and initiating relief flow through the valve and out the outlet 50. The travel of the actuator is preferably limited by a tubular stop 51 disposed to received the piston cylinder 22 in the fully open position. In the open position, the valve allows excessive process pressure to be relieved by the resulting removal of fluid from the system. The safety relief valve will remain open, or at least unlatched, until a new sacrificial buckling pin is installed and the valve is reset to the closed position.

FIG. 3 is a sectional view of an alternative relief valve assembly 60 for use in low pressure systems. This embodiment does not use a sensor stem to transfer system pressure 62 to the buckling pin 64, but instead uses a diaphragm 66 in fluid communication through a pilot tube 68 with the process pressure 62. The diaphragm 66 applies a force upon the buckling pin 64 that corresponds to the process pressure 62 being monitored by the relief valve 60 times the exposed area of the diaphragm 66. Upon collapse of the buckling pin 64, the secondary srem 70 moves toward the buckling pin (to the left in FIG. 3), and, through a mechanical linkage 72, causes the latch arms 74 to move from and release the latch fingers 76 which, in turn, release the latch collar 75 and the primary stem 77. Having been released, the piston 78 is unseated and travels along with the primary stem 77 away from the seat 79 creating an orifice at the seat 79.

Figure 4A:
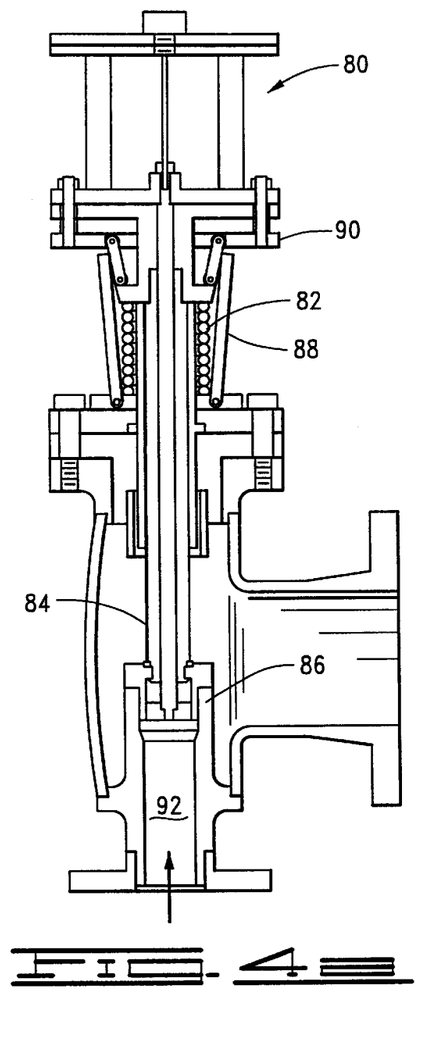
Figure 4B:
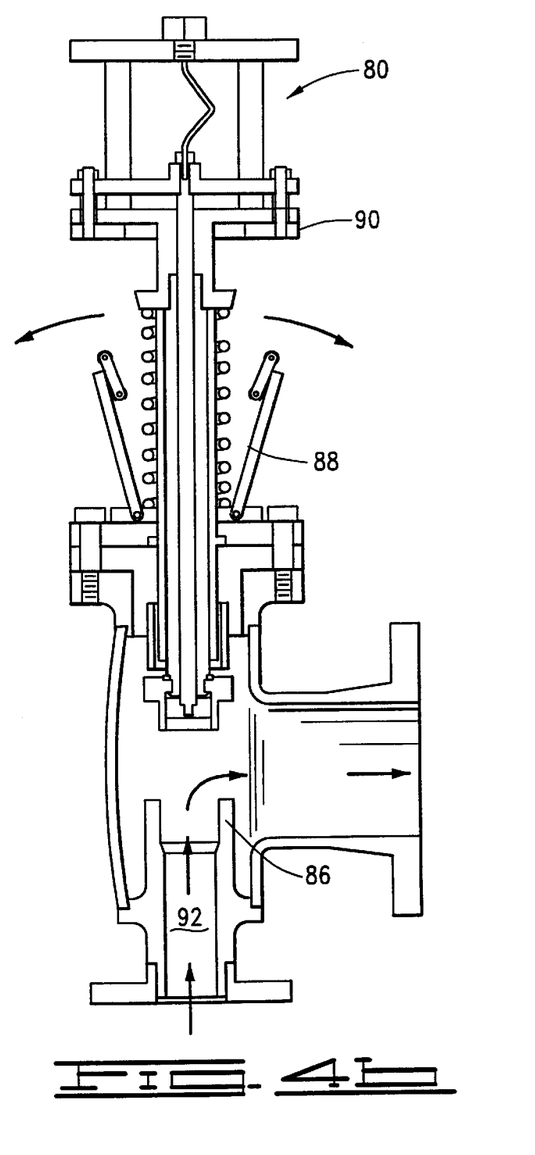

FIGS. 4 (*a* and *b*) are simplified schematic views of a valve 80, similar n construction to the valve shown in FIGS. 2 (*a* and *c*), respectively, modified to include a spring assisted actuator. In FIG. 4 (*a*), the spring 82 compresses to maintain a force urging the primary stem 84 of the actuator in the direction away from the seat 86 and against the latch fingers 88 holding the latch collar 90. In FIG. 4(*b*), upon release of the latch collar 90 of the actuator, the spring 82 pushes the valve open by displacing the actuator away from the seat 86. This modification can be used to perform valve closure unassisted by the system pressure 92, or against the system pressure 92 in a fail safe closed application.

Figure 5:
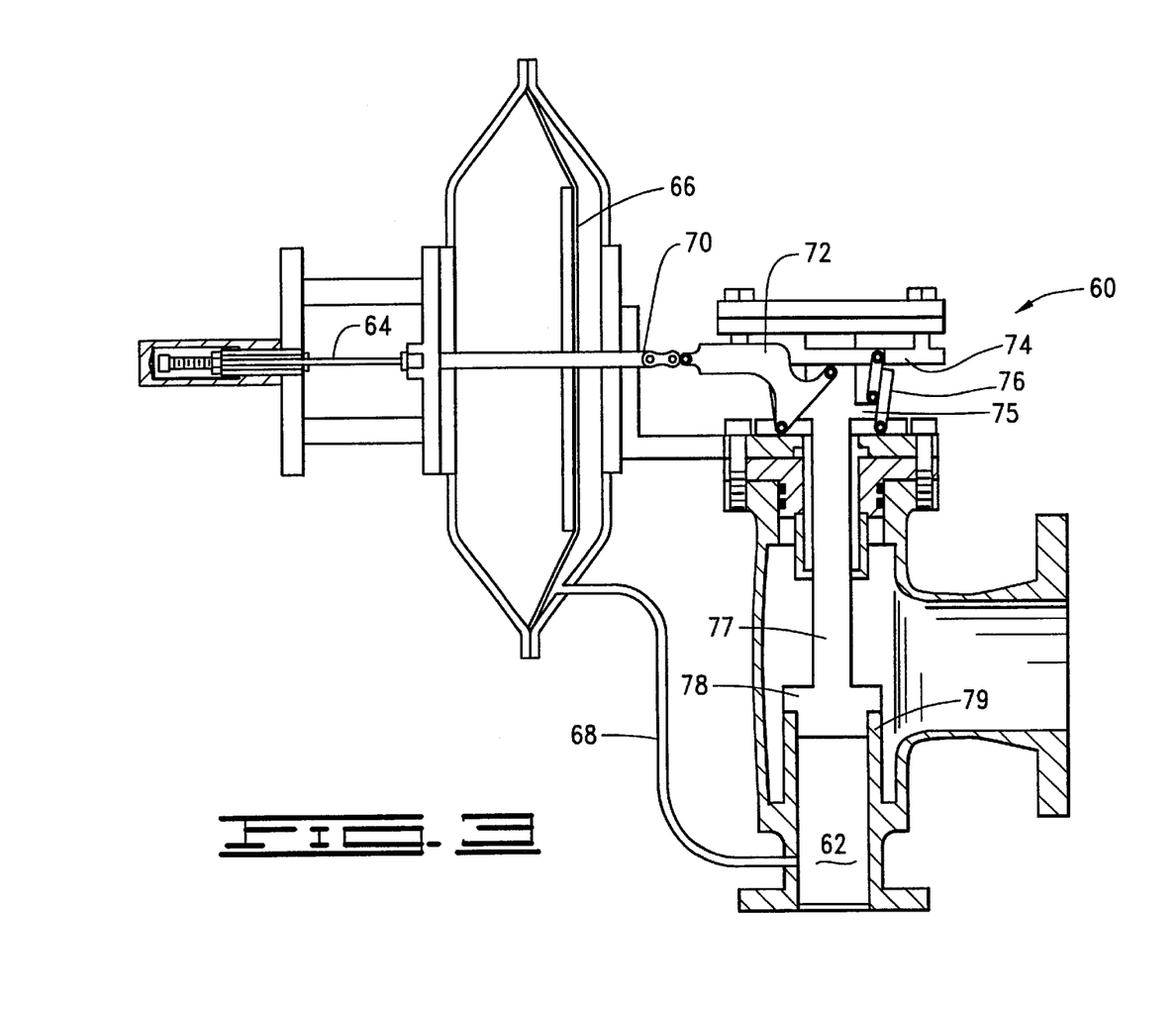
FIG. 5 is an assembly view of a buckling pin valve.

FIGS. 5 and 6 show somewhat more detailed assembly and exploded views of a safety relief valve 100 of the present invention. The safety relief valve 100 is characterized by a hollow body 102 in which is formed from an upper end flange 104 and a lower end flange 106. Intermediate the upper and lower end flanges 104 and 106 is an outlet flange 108. The lower end flange 104 is interconnected to an inlet flange 110. A hollow seat tube 112 is supported on the lower end flange 104 and extends within the body 102.

A bonnet 114 is secured to the outer side of the upper end flange 106, and extends through the upper end flange 106 and into the body 102. The bonnet 114 is secured to the upper end flange 106 by bonnet hex nuts 116 and bonnet hex bolts 118. Bonnet seals 120 maintain a seal between the bonnet 114 and the upper end flange 106. A stop tube 122 is secured to the inner side of the bonnet 114, and extends within the body 102.

A tubular bushing 124 is received within the bonnet 114, and is held in position by a bushing retainer 126 which is secured to the bonnet 114 by retainer bolts 128. Bushing seals 130 maintain a seal between the bushing 124 and the bonnet 114.

The main piston assembly 138 comprises a main piston 140 and a main piston stem 142 extending therefrom. The main piston assembly 138 extends within the body 102 through the upper end flange 106, bonnet 114 and bushing 124, such that the main piston 140 is seatable on the seat tube 112. Main piston seal 144 maintains a sealed relationship between the main piston 140 and the seat tube 112. Stem seal 146 maintains a sealed relationship between the main piston stem 142 and the bushing 124. Supported on the end of the main piston stem 142 opposite the main piston 140 is a latch platform 148.

The sensor piston assembly 150 comprises a sensor piston 152 and a sensor piston stem 154 extending therefrom. The sensor piston assembly 150 extends within the body 102, such that the sensor piston stem 154 is received within the main piston stem 142 and the sensor piston 152 is received within the main piston 140. Sensor piston seal 156 maintains a sealed relationship between the sensor piston 152 and the main piston 140. Supported on the end of the sensor piston stem 154 opposite the sensor piston 142 is a sensor platform shoe 158.

Latch fingers 132 are pivotally mounted on the bushing retainer 126 by means of latch pins 134. Formed adjacent the end of each latch finger 132 is a latch roller 136 which rollingly engages the sensor piston shoe 158.

Supported on the latch platform 148 is a pin cage assembly 160. The pin cage assembly 160 comprises a top plate 166 which is maintained in a spaced position from the latch platform 148 by spacers 164. A spacer 164 is held in a fixed position by a cage post 162 extending therethrough. The cage post 162 extends through the top plate 166 at its upper end, and is threaded into the upper surface of the latch platform 148 at its lower end. The upper end of the cage post is secured to the top plate 166 by an acorn nut 168.

A buckling pin 170 is received within the pin cage assembly and is held in position at its opposite ends by pin inserts 172. The lower pin insert 172 is formed in the upper end of the sensor piston stem 154, while the upper pin insert 172 is disposed within the top plate 166, and held in position by a retainer nut 174.

A further and particularly preferred embodiment ol the present invention is one which is also of a particularly subtle and elegant nature. In addition this embodiment offers an almost infinite number of possible variations all based upon the inventive concept of the present embodiment. In this embodiment a buckling pin valve is used as a pilot valve to control a single larger, or multiple larger, fabricated relief valve or valves operating together as a pressure relief system.

In presently known pilot operated devices it is known to utilize a spring loaded or pressure assisted poppet valve or valves to control a larger diameter relief valve with orifices adjacent to the a pilot valve. These systems tend to be somewhat unreliable due to inaccurate set pressures and may become inoperative should the pilot valve become clogged due to the pilot's relatively small size. Such systems may become cost prohibitive in the larger sizes. Using a rupture pin valve by itself may result in control problems such as "slamming" open. They also may require large, expensive replacement buckling pins and may result in very large valves and relief systems.

This embodiment of the present invention uses a buckling pin device to control one or more (usually) larger fabricated valve or valves. This design allows flexibility in the location of the pilot valve which may be removed from the main valve body. As a result of the buckling pin pilot valve being one of recognized accuracy and its non-clogging design it is possible to increase the total system's accuracy and to reduce the possibility of valve system failure.

By controlling the flow rate of the discharge through the pilot by controlling the size of the rupture pin pilot or by a restricting orifice the speed at which the valve opens can be controlled to reduce or eliminate the "slamming open" which is so often encountered when using the prior art technology. The total size of the system package employing this embodiment of the present invention may also be much smaller physically than the prior art systems.

In appreciating the strength and potential of this embodiment of the present invention, it is important to realize that the present embodiment may use one pilot to control a multiple number of controlled valves. This fact means it is possible to eliminate the need for extremely large valves even when large flows are required. Multiple valves of a reasonable size can be manufactured in a system with one controlling pilot valve which may be remotely located for easy access at a fraction of the cost of a single large rupture pin valve of the prior art design.

Maintenance is easier when the smaller valve system of the present embodiment are employed. In addition such smaller systems are easier to handle over all. Shipping and handling costs are reduced when the smaller, lighter packages and crates made possible by the employment of the present embodiment are utilized. These features reduce the cost of operation for the end user.

The design of one embodiment of the present invention generally designated by reference numeral 700 is shown in FIG. 7. As shown in FIG. 7, valve main piston head 707 is held on the main piston seat 704 by the opposing force created by the balance piston 709 within the balance seat 712. The main piston 707 has a net area which is less than the net area of the balance piston 709 and between the piston stem 710. The balance piston 709 and balance seat 712 work within the confines of the bonnet 711 to create the balance chamber 737. When the system pressure, contained in the balance chamber 737, has transferred from below the main piston 707, through a hollow piston spacer 708 and into the balance chamber 737 and is relieved by the rupture pin pilot valve 722, the net force on the movable piston assembly 736 (composed of main piston 707, piston spacer 708, balance piston 709 and balance piston stem 710-) is shifted from the "downward" or closed position to an "upward" or open position.

As described above, the system pressure is the outside pressure entering the pressure relief valve 738 through the inlet flange 703 which is being controlled by the present system.

The size of the rupture pin valve 722, the transfer holes 739 in the movable piston assembly 736 or both must be controlled to assure complete opening of the main piston 707. For example, if the transfer holes 739 and the rupture pin valve 722 are of sufficient size to bypass all of the required flow to relieve the system, the main piston may not need to open.

In any case, in normal operation the system pressure will then be allowed to flow through the inlet flange 703 main, piston seat 704 and out the outlet flange 705, thus relieving the excessive system pressure to a safe condition.

To place the system back into operation, the movable piston assembly 736 is pushed back "on seat" or downward, until the main piston seal 717 contacts inlet seat 704.

The rupture pin valve 722 is also "reseated", and the pilot piston 724 is pushed downward on the seat (integral part of the body 723) and a new rupture pin 735 is installed.

When system pressure is again "built up", the net forces developed by the movable piston assembly 736 and balance chamber 737 will force the movable piston assembly 736 securely into the main piston seat 704, restoring the system to its full operating condition.

The present embodiment will of course find utility in the flare gas industry and will also find other utility and specific applications anywhere large volumes of gas or liquid must be controlled from over-pressuring the containment system.

The specific and detailed operation of the rupture pin valve in this embodiment is otherwise as described above with regard to the earlier described embodiments.

The other items shown in FIG. 7 which were not necessary to the description of the operation of this embodiment are as follows 701 weld tee, 702 inlet plate, 706 end flange, 713 bushing, 715 bushing snap ring 714 bonnet bolts, 716 bonnet hex nuts, 718,719,720,721 o-rings, 725 bonnet, 726 top plate, 727 spacer, 728 post, 729,730 nuts and 731 bolts, 732,733, and 734 o-rings, As has been noted above the present embodiment may be employed to act as a pilot for a single or multiple other valves. In addition the present pilot embodiment may be cascaded with other pilot or other valve configurations. The present pilot embodiment may be placed in series or parallel configurations to provide cascading effects for added safety and control or to provide further and additional redundancy in a given system.

Figure 8:
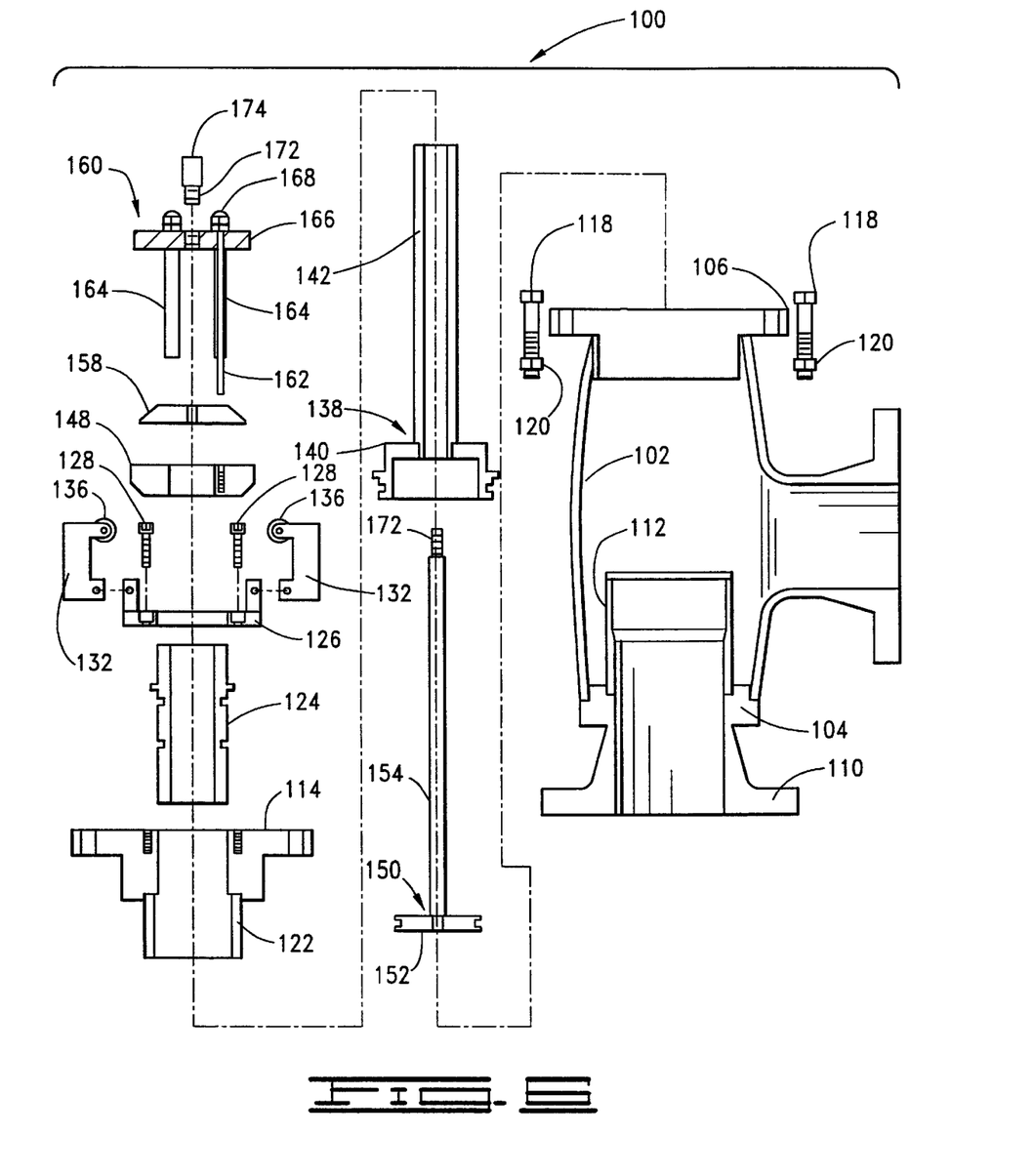
FIG. 8 is a cross-sectional view of a safety relief system in which a single pilot valve is used to control three pressure relief valves connected in parallel.

FIG. 8 shows a pilot valve 800, having the same configuration as the rupture pin valve 722 describe with reference to FIG. 7. The pilot valve 800 acts as a pilot for multiple valves 802, each having the same configuration as the pressure relief valve 738 described with reference to FIG. 7. The valves 802 are connected in parallel to the pilot valve 800.

It may be helpful to emphasize the added freedom which this system provides. The location of the pilot value is now a matter of the designer's choice to obtain the desired degree of safety and control. This embodiment also provides an order of magnitude increase in the level and degree of control which may be obtained, with increased accuracy. The ability of this embodiment to be used in a manner which will prevent clogging of the pilot valve is an addition benefit not previously obtainable, all while obtaining the other benefits of the system. The present embodiment provides for built in redundancy and increased safety—all in the hands of the designer using the pilot valve system. Various size and weights of pistons may be employed as desired since the balance of the unit is the controlling element and since the pressure differential operating on the balance piston may be controlled to a high degree—again all within the control of the designer.

To review the scope of the present invention, and in particular this preferred embodiment, a safety relief system is provided which includes a pilot valve, a pressure relief valve, a body having at least one fluid inlet communicating through a pressure relief valve to at least one fluid outlet, and a pilot valve having at least one buckling pin coupled to buckle at a predetermined system pressure, wherein failure of the buckling pin causes the pressure relief valve to allow fluid communication between the fluid inlet and outlet. The pilot valve may control more than one other valve. The pressure relief valve includes at least one balance chamber assembly responsive to the failure of the buckling pin to allow fluid communication between the inlet and outlet. The balance chamber assembly includes at least two pistons of different areas so that the failure of the buckling pin results in differential forces acting on the pistons causing them to open the flow from the inlet to the outlet. The valve piston is held on a seat by the opposing force created by a balance piston and the pistons are separated by a hollow piston spacer through which fluid may pass. The failure of the buckling pin in the pilot valve results in net forces on a movable piston assembly including pistons and spacer to open the flow from inlet to outlet relieving excessive system pressure to a said condition.

The present invention may also be set forth as a method of relieving excess pressure using a pilot valve, a pressure relief valve, a body having at least one fluid inlet communicating through the pressure relief valve to at least one fluid outlet, with the pilot valve having at least one buckling pin coupled to buckle at a predetermined system pressure, wherein failure of the buckling pin causes the pressure relief valve to allow fluid communication between the fluid inlet and the fluid outlet. The pilot valve may control more than one other valve. The pressure relief valve includes at least one balance chamber assembly responsive to the failure of the buckling pin to allow fluid communication between the inlet and outlet. The balance chamber assembly includes at least two pistons of different areas so that the failure of the buckling pin results in differential forces acting on the pistons causing them to open the flow from inlet to outlet.

The method utilizes a valve piston held on a seat by the opposing force created by a balance piston. The pistons may be separated by a hollow piston spacer through which fluid may pass. The failure of the buckling pin in the pilot valve results in net forces on a movable piston assembly including said pistons and spacer to open the flow from inlet to outlet relieving excessive system pressure to a safe condition.

The method as noted employs a piston secured against a seat and a pilot valve exposed to the pressure to be controlled. The forces are transmitted to a buckling pin in the pilot valve to cause it to fail at a predetermined pressure, that is, the buckling pin is caused to fail when the pressure exceeds a predetermined pressure. The failure of the buckling pin causes the displacement of the pistons to permit the flow fluid from inlet to outlet.

As will be apparent to those skilled in the art the present embodiment may be used in connection with the elements of the earlier described embodiments in any number of combinations, as may be desired. It may be also used with any number of the prior art valve systems in various series and parallel combinations—all within the teaching of the present invention.

It is noted that the embodiment of the safety relief system described herein in detail for exemplary purposes is, of course, subject to many different variations in structure, design, application and methodology. Because many varying and different embodiments may be made within the scope of the inventive concepts herein taught, and because many modifications may be made in the embodiment herein detailed in accordance with the descriptive requirements of the law, it is to be understood that the details herein are to be interpreted as illustrative and not in a limiting sense. It will be understood in view of the instant disclosure, that numerous variations on the invention are now enabled to those skilled in the art. Many of the variations reside; within the scope of the present teachings. It is not; intended to limit the scope of the invention to the particular forms set forth, but on the contrary it is intended to cover such alternatives, modifications, and equivalents as may be included within the spirit and scope of the teachings of the present invention. Accordingly, the invention is to be broadly construed and is to be limited only by the spirit and scope of the claims appended hereto.

What is claimed is:

1. A safety relief system, comprising:
   (A) a pilot valve having at least one buckling pin disposed to buckle at a predetermined system pressure,
   (B) a pressure relief valve, operable in mechanically uncoupled relationship to the pilot valve,
   (C) a body having at least one fluid inlet communicating through said pressure relief valve to at least one fluid outlet,
   (D) wherein failure of said buckling pin causes said pressure relief valve to allow fluid communication between said fluid inlet and said fluid outlet, and
   (E) wherein said pilot valve controls more than one other pressure relief valve.

2. A safety relief system, comprising:
   (A) a pilot valve having at least one buckling pin disposed to buckle at a predetermined system pressure,
   (B) a pressure relief valve, operable in mechanically uncoupled relationship to the pilot valve,
   (C) a body having at least one fluid inlet communicating through said pressure relief valve to at least one fluid outlet,
   (D) wherein failure of said buckling pin causes said pressure relief valve to allow fluid communication between said fluid inlet and said fluid outlet, and
   (E) wherein the pressure relief valve includes at least one balance chamber assembly responsive to the failure of said buckling pin to allow fluid communication between said inlet and said outlet.

3. The system of claim 2 wherein said balance chamber assembly includes at least two pistons of different areas.

4. The system of claim 3 wherein the failure of said buckling pin results in differential forces acting on said pistons causing them to open the flow from said inlet to said outlet.

5. The system of claim 4 wherein the balance chamber assembly comprises a valve piston and a balance piston, and the valve piston is held on a seat by the opposing force created by the balance piston.

6. The system of claim 5 wherein the valve and balance pistons are separated by a hollow piston spacer through which fluid may pass.

7. The system of claim 6 wherein the failure of said buckling pin in said pilot valve results in net forces on a movable piston assembly including the valve and balance pistons and spacer to open the flow from inlet to outlet relieving excessive system pressure to a safe condition.

8. A method of relieving excess pressure, comprising:
(A) providing a pilot valve having at least one buckling pin disposed to buckle at a predetermined system pressure,
(B) providing a pressure relief valve, operable in mechanically uncoupled relationship to the pilot valve,
(C) providing a body having at least one fluid inlet communicating through said pressure relief valve to at least one fluid outlet,
(D) wherein failure of said buckling pin causes said pressure relief valve to allow fluid communication between said fluid inlet and said fluid outlet, and
(E) wherein said pilot valve controls more than one other pressure relief valve.

9. A method of relieving excess pressure, comprising:
(A) providing a pilot valve having at least one buckling pin disposed to buckle at a predetermined system pressure,
(B) providing a pressure relief valve, operable in mechanically uncoupled relationship to the pilot valve,
(C) providing a body having at least one fluid inlet communicating through said pressure relief valve to at least one fluid outlet,
(D) wherein failure of said buckling pin causes said pressure relief valve to allow fluid communication between said fluid inlet and said fluid outlet, and
(E) wherein the pressure relief valve includes at least one balance chamber assembly responsive to the failure of said buckling pin to allow fluid communication between said inlet and said outlet.

10. The method of claim 8 wherein said balance chamber assembly includes at least two pistons of different areas.

11. The method of claim 8 wherein the failure of said buckling pin results in differential forces acting on said pistons causing them to open the flow from said outlet.

12. The method of claim 8 wherein the balance chamber assembly comprises a valve piston and a balance piston, and the valve piston is held on a seat by the opposing force created by the balance piston.

13. The method of claim 12 wherein the valve and balance pistons are separated by a hollow piston spacer through which fluid may pass.

14. The method of claim 13 wherein the failure of said buckling pin in said pilot valve results in net forces on a movable piston assembly including the valve and balance pistons and spacer to open the flow from inlet to outlet relieving excessive system pressure to a safe condition.

* * * * *